United States Patent [19]

Binnewies

[11] Patent Number: 4,846,132

[45] Date of Patent: Jul. 11, 1989

[54] ARRANGEMENT FOR THE IDENTIFICATION OF THE MASS AIR STREAM SUPPLIED TO THE CYLINDERS OF AN INTERNAL COMBUSTION ENGINE

[75] Inventor: Ludwig Binnewies, Kirchhain, Fed. Rep. of Germany

[73] Assignee: Siemens Aktiengesellschaft, Berlin and Munich, Fed. Rep. of Germany

[21] Appl. No.: 133,939

[22] Filed: Dec. 17, 1987

[30] Foreign Application Priority Data

Dec. 19, 1986 [DE] Fed. Rep. of Germany ..... 36543547

[51] Int. Cl.[4] ...................... F02D 41/18; F02D 33/02; G01F 1/00

[52] U.S. Cl. .................................. 123/488; 73/118.2; 123/494

[58] Field of Search ............... 123/418, 488, 492, 493, 123/494; 73/118.2

[56] References Cited

U.S. PATENT DOCUMENTS 4,359,991 11/1982 Stumpp et al. .
4,359,993 11/1982 Carlson .
4,424,568 1/1984 Nishimura et al. .
4,550,705 11/1985 Nagano et al. .
4,594,987 6/1986 Wataya et al. ...................... 123/494
4,706,631 11/1987 Wataya .............................. 123/488

FOREIGN PATENT DOCUMENTS 59-15656 1/1984 Japan .
61-61010 3/1986 Japan .

*Primary Examiner*—Tony M. Argenbright

[57] ABSTRACT

An arrangement for the identification of the mass air stream supplied to the cylinders of an internal combustion engine. A controlled unit serves the purpose of controlling a prescribed relationship between mass air stream and fuel quantity, whereby a correction quantity ($\tau$) from a performance characteristics memory is deposited dependent on at least one operating parameter. In accordance with the invention, this thereby involves a correction quantity which takes the dynamic behavior of the intake system, particularly its storage capacity, into consideration. Accordingly, the control unit identifies a corrected mass air stream which is smaller or, respectively, greater than the measured mass air stream by the sub-stream filling the storage or, respectively, flowing off from the storage.

2 Claims, 1 Drawing Sheet

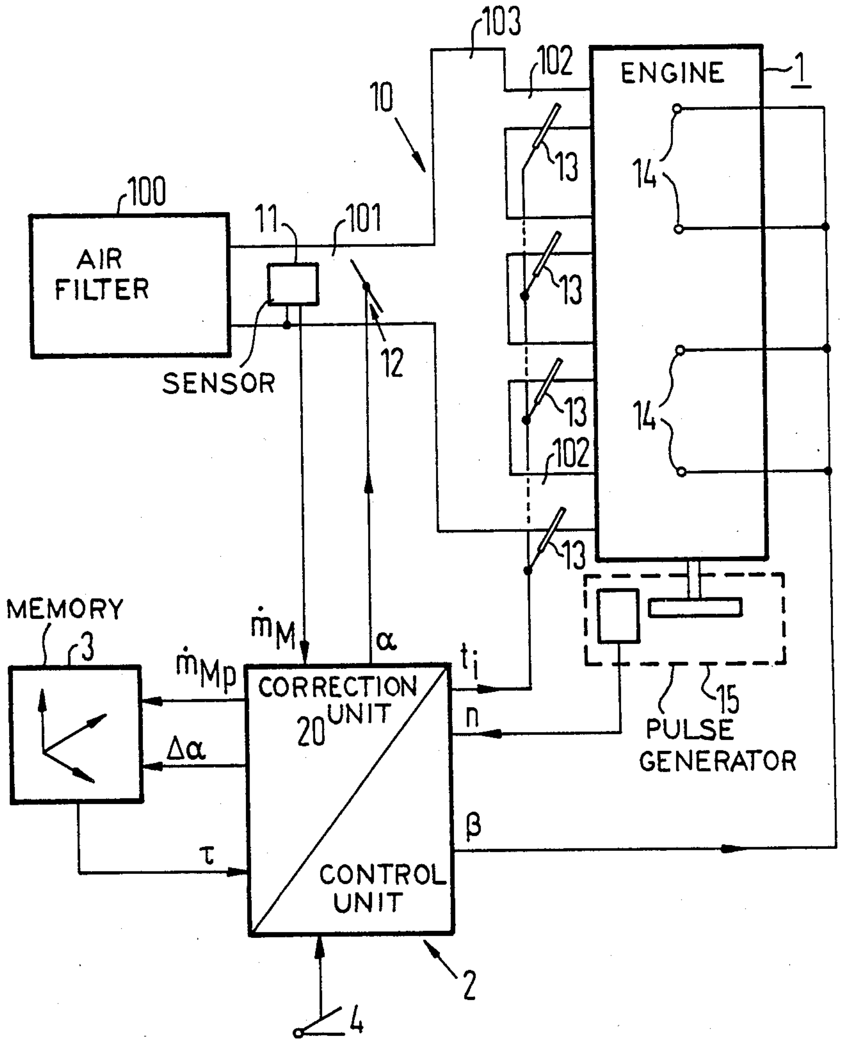
103
102
ENGINE
1
10
13
14
100
AIR
FILTER
11
101
13
12
SENSOR
13
14
102
13
MEMORY
3
$\dot{m}_M$
α
$t_i$
$\dot{m}_{Mp}$
CORRECTION
UNIT
20
n
15
PULSE
GENERATOR
Δα
β
τ
CONTROL
UNIT
2
4

ARRANGEMENT FOR THE IDENTIFICATION OF THE MASS AIR STREAM SUPPLIED TO THE CYLINDERS OF AN INTERNAL COMBUSTION ENGINE

BACKGROUND OF THE INVENTION

The invention is directed to an arrangement for the identification of the mass air stream supplied to the cylinders of an internal combustion engine.

The quality of the combustion of the fuel supplied to an internal combustion engine is critically dependent on how precisely the mass air stream actually supplied to the individual cylinders of an internal combustion engine is identified. This can deviate from the mass air stream measured in the intake system for a great variety of reasons, whereby this deviation can also be a function of operating parameters.

In the arrangement disclosed by U.S. Pat. No. 4,527,530, a correction memory for an experimentally identified correction value is therefore provided, the respective measured value of the mass air stream being corrected therewith. The correction quantity is thereby dependent on the operating parameter of the velocity of the internal combustion engine and eliminates errors which arise from speed-dependent pulsations of the mass air stream in the intake system.

In U.S. Pat. No. 4,527,530, however, this known arrangement is expressly provided and suitable only for the correction of static conditions.

SUMMARY OF THE INVENTION

It is therefore an object of the invention to identify the mass air stream actually supplied to the internal combustion engine with great precision in the dynamic range as well.

In accordance with the invention, therefore, the correction quantity describes the dynamic behavior of the intake system between a measuring means and the internal combustion engine, namely dependent on the operating parameters of position change of the final control element for the mass air stream, and measured value of the mass air stream before the position change of the final control element, referred to below as a parameter value.

The value of the correction quantity recorded in a correction memory is experimentally identified for a specific internal combustion engine with a given intake system dependent on the afore-mentioned operating parameters.

The invention is based on the perception that it is precisely the unstationary, dynamic behavoir of the intake system which is in need of correction and which can also be corrected. The invention is thereby based on the observation that the delayed reaction of the internal combustion engine to a change in position of the final control element for the mass air stream is also based on the effect of the storage capacity of the intake system between an air mass meter and the intake valves of the internal combustion engine. Following a sudden opening of the final control element fashioned, for example, as a throttle valve, one part of the mass air stream acquired by the air mass meter serves the purpose of filling up the intake system and does not flow into the internal combustion engine. Inversely, the mass air stream flowing in the internal combustion engine is not reduced after a closing of the throttle valve to the same degree as it is acquired by the air mass meter; on the contrary, a part of the air mass stored in the intake system still flows off into the internal combustion engine.

The mass air stream critical for the control of the internal combustion engine is periodically identified during operation of the internal combustion engine in accordance with the following differential equation $$\overset{\odot}{m}=\overset{\odot}{m}_{Ma}+(\overset{\odot}{m}_{Mn}-\overset{\odot}{M}_{Ma})\cdot\tau^{-1}$$

wherein:

$\overset{\odot}{m}$ is the mass air stream supplied to the internal combustion engine;

$\overset{\odot}{m}_{Ma}$ is the old value of the measured mass air stream, $\overset{\odot}{m}_{Mn}$ is the new value of the measured mass air stream, and $\tau$ is the correction quantity supplied by the performance characteristic memory.

Physically, the correction quantity $\tau$ thereby denotes a time constant which characterizes the dynamic behavior of the "store" of the intake system dependent on the operating parameters of "mass air stream" and "position change" of the final control element.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

The single FIGURE depicts in schematic form the present invention.

DESCRIPTION OF THE PREFERRED EMBODIMENT

The invention shall be set forth with reference to an exemplary embodiment schematically shown in the FIGURE. This shows an internal combustion engine 1 having four cylinders and an intake system 10 which extends between an air filter 100 and the intake openings of the individual cylinders and which, accordingly, has a central, main pipe 101, a distributor part 103 connecting thereto and branching pipes 102 proceeding from the latter and leading to the individual cylinders. A measuring means 11 for the mass air stream, such as an air mass meter, is located in the main pipe 101 and a final control element 12 for the mass air stream in the form of a throttle valve is positioned following thereupon, the position, that is the positional angle, of the latter being dependent on a control unit 2. Injection valves 13 which are likewise driven by the control unit 2, preferably sequentially, with an injection time $t_i$ discharge into the individual branch pipes 102. The control unit 2 also determines the firing angle $\beta$ with which ignition pulses are output to spark plugs 14 for the individual cylinders. To this end, the control unit 2 is supplied with rpm signals and position signals from a pulse generator 15 coupled to the internal combustion engine 1, with control values from a pedal value generator 4 and with the measured values $m_M$ of the air mass meter 11. From these and other influencing variables not under discussion here, the control unit 2 determines the injection time $t_i$ of the injection valves, the position of the throttle valve 12 as well as the firing angle in a known way for every control value of the pedal value generator 4, determining these such that prescribed conditions of mass air stream to the quantative fuel stream are observed in the static condition, these, of course, also being capable of having different values dependent on the operating range. The observation of a defined relationship can thereby be limited to individual operating ranges of the internal combustion engine or can have different values dependent on the operating range.

In a prior art air-guided system of this type, the control unit 2 identifies a pre-control value for the adjustment of the throttle valve 12 and for the duration of the injection pulses $t_i$ for every control value of the pedal value generator 4 via operating performance characteristics. These pre-control values are then corrected with a underlying control circuit dependent on the mass air stream acquired by the air mass meter 11, being corrected such that a prescribed relationship between mass air stream and fuel stream is observed in specific operating conditions. In known systems of this type, this goal is only achieved to the degree to which the mass air stream acquired by the air mass meter is also identical to the mass air stream in fact flowing into the internal combustion engine. As initially set forth, however, this prerequisite is not met without further considerations.

In order to also optimally observe the desired relationship of the quantity streams in the dynamic range, a performance characteristics memory 3 is provided in accordance with the present invention. The correction quantities in the form of time constants $\tau$ dependent on the parameters of mass air stream $\dot{m}_{Mp}$ and position change s of the throttle valve angle $\alpha$ being stored therein. The control is based on an air mass stream $\dot{m}$ which takes the dynamic behavoir of the intake system 10 into consideration, namely in the form of the time constant deposited in the performance characteristics memory 3. To this end, as is standard in computer-controlled control units, the control variables (throttle valve angle, injection time) are periodically calculated from the measured quantities (mass air stream, rpm, control value of the pedal value generator) and are intermediately stored. With the same time clock or with a time clock deviating therefrom, the respective sub-change $\Delta\alpha$ of the setting of the throttle valve 12 between two clock pulses is identified with a correction unit 20 in the control unit 2. As soon as a sub-change $\Delta\alpha$ is greater than a limit value A, a correction segment within which the correction calculation is carried out begins. The correction value $\tau$ is thereby read out of the performance characteristics dependent on the two parameter values. The one parameter value is the most recent measured value of the mass air stream $\dot{m}_{Mp}$ before a sub-change $\Delta\alpha$ greater than A was identified for the first time. The second parameter value is the position change $s_i$ which changes in steps during the correction segment and which is formed after every time clock as the sum of successive sub-changes:

$$s_i = \sum_{i=1}^{n} \Delta\alpha_i,$$

beginning with the first $\Delta\alpha_1$ greater than A ($s_1 = \Delta\alpha_1$). Based on the same parameter value $\dot{m}_{Mp}$ of the mass air stream, the appertaining correction quantity $\tau_i$ is read out from the performance characteristics for every positional change $s_i$; after every time clock, the correction unit 20 thus identifies the corrected mass air stream on which the control is to be based, identifying this in accord with the differential equation:

$$\dot{m} = \dot{m}_{Ma} + \dot{m}_{Mn} - \dot{m}_{Ma} \cdot \tau^{-1}$$

whereby $\dot{m}_{Mn}$ is the most recently measured new value and $\dot{m}_{Ma}$ is the old value of the mass air stream measured in the preceding time clock.

The identification of $\tau_i$ ends as soon as $\Delta\alpha_{n+1}$ falls below a minimum value B (preferably equal to A/2). After this, the afore-mentioned correction calculation is executed after every new measured value of the mass air stream, being executed with the same, most recent $\tau_i$ value until:

$$|m_{neu} - m_{alt}| \leq K,$$

whereby K is a prescribable fixed value. The correction segment ends as soon as this condition is met, i.e., the process has already become largely stationary, and every further correction calculation is ended together with it. The same procedure is repeated in the next correction segment which again begins with $\Delta\alpha > A$. The identification of a corrected mass air stream is thus chronologically limited to correction segments. This limitation of the operation to relatively large, triggering subchanges results in a greater stability of the control circuit, particularly given small mass air streams (idle) and results in a faster operation when a sub-change is greater than the limit value A.

Insofar as the dynamic behavior is different during opening of the throttle valve such as acceleration, than during closing thereof that is thrust, the performance characteristics memory 3 must contain different correction values $\tau$ for positive and negative position changes. In such a case the performance characteristics memory is preferably composed of two sub-memories of which the one supplies the correction quantities given positive positional change (acceleration) and the other supplies the correction quantities given negative positional change (thrust). The operating condition is thereby to be identified first before the read-out of one of the two sub-memories with the aforementioned parameters. To this end, the moving direction of the final control element, operational sign of the positional change s, namely of the throttle valve, can be evaluated in a known way.

The invention can be utilized in the same way when the pedal value generator determines the injection time via an operating performance characteristics and, thus, determines the size of the fuel quantity stream and the control unit sets the air mass stream appertaining thereto on the basis of the measurement of the air mass meter. Here, too, the inventive correction of the measured value supplied by the air mass meter guarantees an optimum adaption of the mass streams in the dynamic operating range as well.

In most cases, the control of the mass air stream and/or fuel quantity stream will also be dependent in a known way on numerous, further operating parameters, whereby such dependencies can also be deposited in further correction performance characteristics.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for the identification of mass air stream supplied to the cylinder of an internal combustion engine via an intake system having main pipe, distributor pipe and branch pipe and having a measuring means and a final control element for the mass air stream ($\dot{m}$) in the main pipe, and having a performance characteristics memory for correction performance characteristics which supplies a correction quantity ($\tau$) dependent on at least one operating parameter, and having a correction unit which identifies the mass air stream ($\dot{m}$) dependent on the measured value ($\dot{m}_M$) of the mass air stream and of the correction quantity ($\tau$), comprising the correction quantity ($\tau$) describing the dynamic behavior of the intake system between the measuring means and the internal combustion engine, namely dependent on the operating parameters of position change (s) of the final control element for the mass air stream based on size and direction, and measured value ($\dot{m}_{Mp}$) of the mass air stream before the position change of the final control element.

2. An arrangement for the identification of mass air stream supplied to the cylinders of an internal combustion engine via an intake system having main pipe, distributor pipe and branch pipe and having a measuring means and a final control element for the mass air stream ($\dot{m}$) in the main pipe, and having a performance characteristics memory for correction performance characteristics which supplies a correction quantity ($\tau$) dependent on at least one operating parameter, and having a correction unit which identifies the mass air stream ($\dot{m}$) dependent on the measured valve ($\dot{m}_M$) of the mass air stream and of the correction quantity ($\tau$), comprising the correction quantity ($\tau$) describing the dynamic behavior of the intake system between the measuring means and the internal combustion engine, namely dependent on the operation parameters of position change (s) of the final control element for the mass air stream based on size and direction, and measured value ($\dot{m}_{Mp}$) of the mass air stream before the position change of the final control element, the correction unit periodically identifying the mass air stream ($\dot{m}$) in accordance with the differential equation:

$$\dot{m}=\dot{m}_{Ma}+(\dot{m}_{Mn}-\dot{m}_{Ma})\cdot\tau^{-1}$$

whereby $\dot{m}$ is the mass air stream supplied to the internal combustion engine, $\dot{m}_{Ma}$ is the old value of the measured mass air stream, $\dot{m}_{Mn}$ is the new value of the measured mass air stream, and $\tau$ is the correction quantity supplied by the performance characteristics memory.

* * * * *